United States Patent
Huie et al.

(10) Patent No.: US 7,047,317 B1
(45) Date of Patent: May 16, 2006

(54) HIGH PERFORMANCE NETWORK ADDRESS PROCESSOR SYSTEM

(75) Inventors: Jonathan Lockwood Huie, Campbell, CA (US); James Michael O'Connor, Union City, CA (US)

(73) Assignee: Altera Corporation, San Jose, CA (US)

( * ) Notice: Subject to any disclaimer, the term of this patent is extended or adjusted under 35 U.S.C. 154(b) by 454 days.

(21) Appl. No.: 09/594,205

(22) Filed: Jun. 14, 2000

(51) Int. Cl.
*G06F 15/16* (2006.01)
*G06F 7/38* (2006.01)
*G06F 12/00* (2006.01)

(52) U.S. Cl. .................. 709/245; 708/233; 712/140
(58) Field of Classification Search ........... 711/108, 711/148, 169, 140; 707/1, 100; 709/236, 709/223, 242, 245; 370/335, 389, 395.32; 708/233
See application file for complete search history.

(56) References Cited

U.S. PATENT DOCUMENTS

| | | | |
|---|---|---|---|
| 5,666,494 A * | 9/1997 | Mote, Jr. .................. | 711/167 |
| 5,787,430 A * | 7/1998 | Doeringer et al. .......... | 707/100 |
| 6,401,117 B1 * | 6/2002 | Narad et al. ............... | 709/223 |
| 6,404,752 B1 * | 6/2002 | Allen et al. ................ | 370/335 |
| 6,421,730 B1 * | 7/2002 | Narad et al. ............... | 709/236 |
| 6,441,053 B1 * | 8/2002 | Klein et al. ................ | 514/789 |
| 6,460,112 B1 * | 10/2002 | Srinivasan et al. ......... | 711/108 |
| 6,460,120 B1 * | 10/2002 | Bass et al. ................. | 711/148 |
| 6,539,369 B1 * | 3/2003 | Brown ....................... | 707/1 |
| 6,633,865 B1 * | 10/2003 | Liao ........................... | 707/3 |
| 6,768,739 B1 * | 7/2004 | Kobayashi et al. ......... | 370/392 |
| 6,778,530 B1 * | 8/2004 | Greene ...................... | 370/389 |

OTHER PUBLICATIONS

David Brown, Method and apparatus for IP longest prefix match, Dec. 10, 1999, Provisional Application for Patent Whole document.*
Gupta et al, "Routing Lookups in Hardware at Memory Access Speeds", Apr. 1998, IEEE Infocom, pp. 1-8.*
Degermark et al, "Small Forwarding Tables for Fast Routing Lookups", Proc. ASM/SIGCOMM 1997, pp. 3-14, Cannes France.*

* cited by examiner

*Primary Examiner*—David Wiley
*Assistant Examiner*—Michael Delgado
(74) *Attorney, Agent, or Firm*—Martine Penilla & Gencarella, LLP

(57) ABSTRACT

A high performance network address processor is provided comprising a longest prefix match lookup engine for receiving a request for data from a designated network destination address. An associated data engine is also provided to couple to the longest prefix match lookup engine for receiving a longest prefix match lookup engine output address from the longest prefix match lookup engine and providing a network address processor data output corresponding to the designated network destination address requested. The high performance network address processor longest prefix match lookup engine comprises a plurality of pipelined lookup tables. Each table provides an index to a given row within the next higher stage lookup table, wherein the last stage, or the last table, in the set of tables comprises an associated data pointer provided as input to the associated data engine. The associated data engine also comprising one or more tables, the associated data engine generating a designated data output associated with the designated network address provided to the high performance NAP.

11 Claims, 3 Drawing Sheets

HIGH PERFORMANCE NETWORK ADDRESS PROCESSOR SYSTEM

FIELD OF INVENTION

This invention relates to internet protocol routing processors, particularly to efficient internet protocol search engines.

BACKGROUND OF INVENTION

The most common bottleneck to fast internet protocol (IP) routing processors resides in having a fast and efficient IP searching method and to speed up forwarding operations. Typical IP search engines and network address processors provide a single central routing table such as provided by the Internet Protocol Routing Processor, IPRP-V4 and its associated family of Internet Protocol Routing Processor, provided by Alliance Semiconductor of Santa Clara, Calif. The IPRP family of network address processors operate at a typical frequency of 66 MHz and upon receipt of a given 32-bit wide destination address, the network address processor searches its central lookup table for a matching entry, i.e., an entry matching the largest number of higher order bits of the destination address according to the CIDR protocol. When greater than 16-bits addressing is required for routing an IP packet, a 16-bit output from the network address processor is used as a pointer to an external memory for further address matching searching. Accessing an external memory consequently adds to processing time and cost.

Thus, with the ever increasing and escalating consumer demand and usage of internet applications there is a need for a network address processor to handle faster and greater network address routing requirements to avoid internet traffic bottlenecks.

SUMMARY OF INVENTION

A high performance network address processor (NAP) is provided comprising a longest prefix match lookup engine for receiving a data lookup request and in response thereto provide a key and data pointer address to an associated data engine. The associated data engine in response thereto then provides a NAP data output associated with a designated network destination address requested. The high performance NAP longest prefix match lookup engine comprises a plurality of pipelined lookup tables, each table of a predetermined size, calculated based on the number of entries in the next higher sequenced table. Each lower level table thus provides an index to a given row within the next higher stage lookup table. The output of the longest prefix match lookup engine comprises an associated data pointer provided as input to the associated data engine. The associated data engine also comprises one or more lookup tables, wherein the associated data engine generates a designated data output in response to the output of a longest prefix match lookup engine. The associated data engine also comprises a plurality of update functions associated with each lookup table. These update functions modify the designated data output based on a plurality of data fields provided to the high performance network address processor with the data lookup request.

The high performance network address processor thus allows on-the-fly modification of indexed user data, and also offloads CPU intensive operations from other processors in the system. For applications with longest-prefix match searches (including CIDRs), a NAP-based solution achieves greater densities than other TCAM-based approaches. Moreover, the NAP provides lower power dissipation.

DETAILED DESCRIPTION OF PREFERRED EMBODIMENT(S)

Figure 1:
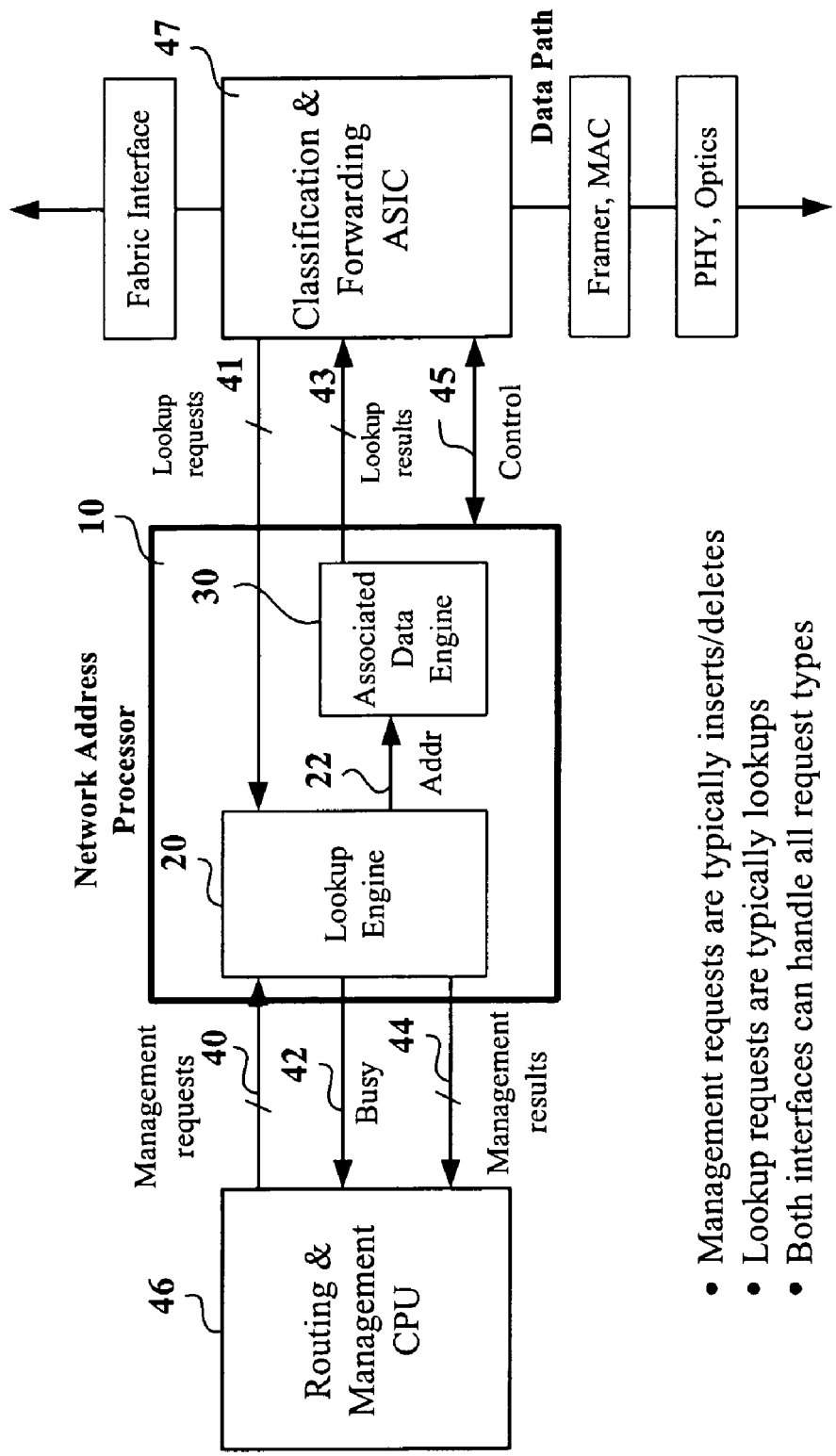
FIG. 1 is a general block diagram illustrating a network address processor in a typical system application according to the principles of this invention.

FIG. 1 illustrates a general block diagram illustrating a network address processor (NAP) 10 according to the principles of this invention. High performance NAP 10 comprises a longest prefix match lookup engine 20 for receiving a request for data 40 of a designated network destination address. An associated data engine 30 is also provided and coupled to the longest prefix match lookup engine 20 for receiving a longest prefix match lookup engine output 22 comprising an address pointer and key from the longest prefix match lookup engine 20. The associated data engine provides in response thereto a network address processor data output 43 corresponding to the designated network destination address provided to NAP 10.

Figure 2:
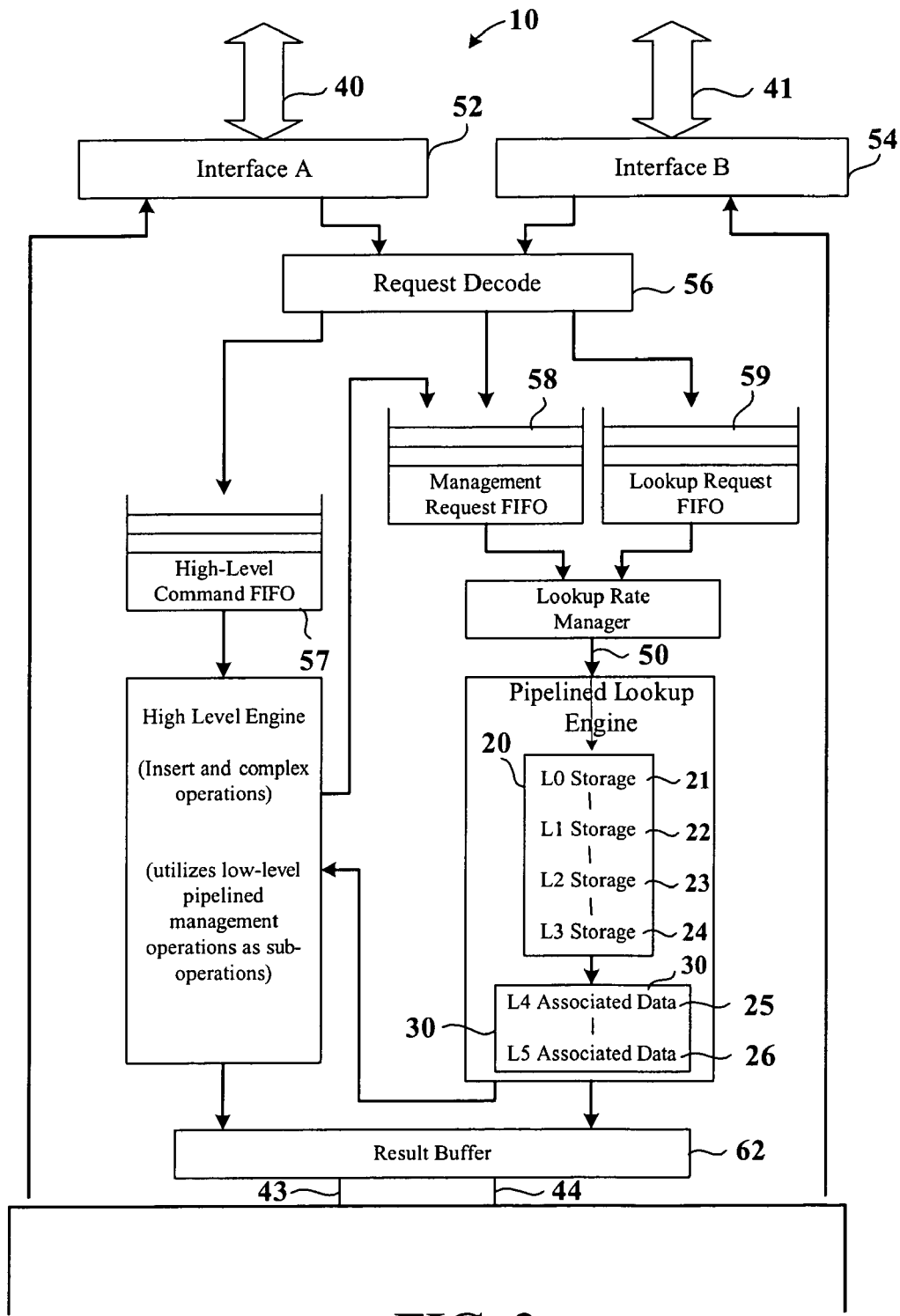
FIG. 2 is a more detailed block diagram of the network address processor shown in FIG. 1.
Figure 3:
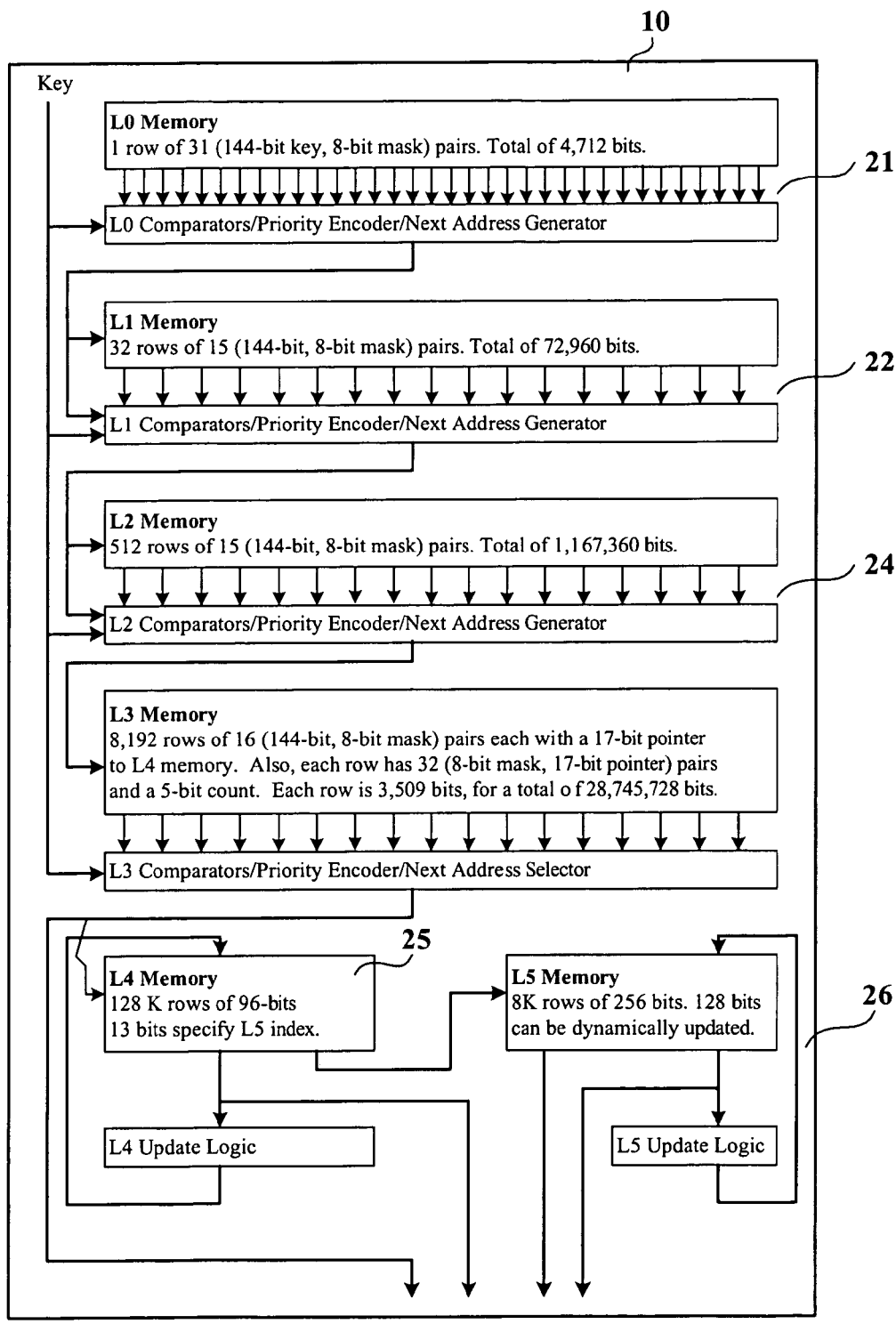
FIG. 3 is a more detailed block diagram of the longest prefix match lookup engine and the associated data engine of the network address processor illustrated in FIGS. 1 and 2.

The high performance network address processor longest prefix match lookup engine 20 comprises a plurality of pipelined lookup tables as described in greater detail relative to FIGS. 2–3. Each lower stage provides an index to a given key within the next higher stage lookup table. In the preferred embodiment, associated data engine 30 also comprises one or more associated tables and generating as an output, an associated designated data output 43 corresponding to the requested network address 40 provided to NAP 10.

In the preferred embodiment, NAP 10 is designed to allow a large number of pipelined lookup requests to access and update data associated with a given key. The core of the NAP 10 comprises a pipelined longest prefix match lookup engine 20, and an associated data engine 30 comprising one or more associated lookup tables for storing and reading associated data. Keys are maintained with associated masks. These masks indicate the number of least-significant "don't-care" bits within a key and allow multiple range entries with overlapping endpoints to be maintained within the NAP.

FIG. 2 illustrates a more detailed block diagram of the network address processor shown in FIG. 1. In the preferred embodiment, NAP 10 comprises a first interface 52 (interface A) and a second interface 54 (interface B). Each of interfaces A and B comprises an associated ZBT SSRAM interface coupled to receive associated out-of-band signals, i.e., interface A is coupled to routing and management CPU 46 and interface B is coupled to a classification and forwarding ASIC 47. Interfaces A and B also provide packet assembly functions, such as collecting an address lookup request sent using multiple bus cycles. Similarly, each interface A and B also partitions output data requiring several bus requests to complete data transfer.

As an illustration of the operations of NAP 10, a lookup address request 41 received via interface B from classification and forwarding ASIC 47 of FIG. 1 is provided to a request decoder 56. Request decoder 56 then determines if the type of request received is a lookup request, a management request, or a high-level command request, and in response thereto to stack the received address with the appropriate FIFO, i.e., provides a lookup address 41 to lookup request FIFO 59. Request decoder 56 also arbitrates between interfaces A and B so that if both interfaces present a request on the same cycle, only one will be serviced. If request handles are not used, then request decoder 56 assigns request numbers as well.

Preferably, a high-level command FIFO, a management request FIFO, and a lookup request FIFO are provided for greater flexibility in network addressing applications. Thus, with three independent FIFOs, each FIFO holds decoded requests to be serviced. Consequently, lookup rate manager can allocate priority to control for every cycle, to choose whether to service a request from the Lookup Request FIFO or the Management Request FIFO. Optimally, rate manager makes this choice based on the values defined by configurable registers so as to guarantee service to a certain rate of lookup requests.

FIG. 3. illustrates the pipelined longest prefix match lookup engine 20 in greater detail. Pipelined longest prefix match lookup engine comprising one or more pipelined lookup tables 21, 22, 23, and 24 services all lookups and low-level management requests. First lookup stage 21 (L0), second lookup stage 22 (L1), third lookup stage 23 (L2), and fourth lookup stage 24 (L3) these stages are used to index a given key within the L4 table 25 of an associated data engine 30. L4 Stage 25 comprises a set of keys and their associated data pointers stored within entries of L4. L4 data stage 25 comprises the per-route data, and a pointer to an associated L5 data. Read-modify-write operations take place on data entries selected at this stage. L5 data stage 26 comprises the final stage of the lookup pipeline comprising longest prefix match lookup engine 20 and associated data engine 30. Data entry selected from L4 stage 25 comprises per hop/per RMON/per customer data. L4 and L5 stages also provide the read-modify-write operations.

Result Buffer 62 collects all the associated status and data provided from longest prefix match lookup engine 20 and associated data engine 30 in response to a request 41 that flows through longest prefix match lookup engine 20 or the associated data engine 30. Interfaces A and B responding to read requests receive of their data from here. High Level Engine 60 provides high-level operations, such as insert and delete, using multiple low-level management requests.

The following Table 1 illustrates a sample implementation of stages L0–L5.

TABLE 1

Storage Levels

| Level | # Entries | Content | |
|---|---|---|---|
| L0 | 31 | 144-bit Key | 8-bit Mask |
| L1 | 480 | 144-bit Key | 8-bit Mask |
| L2 | 7680 | 144-bit Key | 8-bit Mask |
| L3 | 128K | 144-bit Key | 8-bit Mask 17-bit Associated Data ID |
| L3 per bucket | 8K | 5-bit Count | 32 (8-bit Mask, 17-bit Associated Data ID) pairs |
| L4 User Data | 128K | 96-bit Data | |
| L5 User Data | 8K | 256-bit Data | |

Table 2 below illustrates a sample implementation of memory organization of the various stages of longest prefix match lookup engine 20 and associated data engine 30.

TABLE 2

Memory Organizations

| | Width | Height | Size | Compares |
|---|---|---|---|---|
| L0 | 4712 bits | 1 | 4.6 Kb SRAM | 31 144-bit |
| L1 | 2280 bits | 32 | 71.25 Kb SRAM | 15 144-bit |
| L2 | 2280 bits | 512 | ~1.11 Mb SRAM | 15 144-bit |
| L3 | 3509 bits | 8 K | ~27.4 Mb DRAM | 48 144-bit |
| L4 Data | 96 bits | 128 K | 12 Mb DRAM | |
| L5 Data | 256 bits | 8 K | 2 Mb DRAM | |
| Total | | | ~1.2 Mb SRAM | 109 144-bit |
| | | | ~41.4 Mb DRAM | |

Lookup Pipeline

FIG. 3 depicts the essential operation of the lookup pipeline 20. Each stage is further described below. The input to lookup pipeline 20 is a key that is to be looked up and provided at either input 40 or 41 (see FIG. 2) to NAP 10. The output of the pipeline is the following associated with the highest priority (longest prefix) match to the supplied search key. A pointer to L4 memory 25 points to a content of the referenced 96-bit L4 memory word, and the contents of the referenced 256-bit L5 memory word. Some embodiments may have some subset of these outputs; some may specify others—such as the matching key, the matching priority, and the address of the matching L3 item. Additional status bits indicating success, failure, or other conditions may also be provided.

L0 Memory

This memory comprises a row of 31 key/mask pairs. Each lookup request reads all 31 entries from the L0 memory. Preferred embodiment is that all 31 pairs are read in a single cycle. Alternatively, all 31 pairs can be read sequentially, but this could limit the rate at which requests could be serviced. Preferably, entries in this memory are sorted, and reflect the maximum key that would be stored in the $16^{th}$ position in the corresponding row of the L1 Memory.

L0 Comparators/Priority Encoder/Next Address Generator

The 31 keys with associated masks, along with the search key are provided as input to this stage. This stage selects the smallest entry that is greater than or equal to the input search key. If multiple entries have the same key, the key with the smallest mask is selected. The position of the selected element is the output of this stage. Thus, in this embodiment, a 5-bit value indicating which of the 31 elements was selected is passed to the L1 stages. If no entries are greater than the supplied key, the index passed to the L1 memory is the value 32.

L1 Memory

This memory is logically organized as 32 rows of 15 key/mask pairs. Based on the 5 bits generated in the previous stage L0, one row of the L1 Memory is selected. Each lookup request reads all 15 entries from the selected row. Preferred embodiment is that all 15 are read in a single cycle. Alternatively, all 15 entries may be read sequentially, but this could limit the rate at which requests could be serviced. Similar to L0, the entries in this memory preferably are sorted, and reflect the maximum key stored in the corresponding row of the L2 Memory.

L1 Comparators/Priority Encoder/Next Address Generator

The 15 keys, with associated masks, along with the search key and the address generated from stage L0 are the input to this stage. This stage selects the smallest entry that is greater than or equal to the input search key. If multiple entries have the same key, the key with the smallest priority is selected. Again, if no entries are greater than the supplied key, the 4-bit value of the selected entry is the value 15. The position of the selected element, combined with the address of the row selected by the L0 stage, is the output of this block. Thus, in this embodiment, the 5-bit address from the output of the L0 stage is concatenated with the 4-bit value indicating which of the 16 elements was selected. The resulting 9-bit address is passed to the L2 stage.

L2 Memory

This stage is logically organized as 512 rows of 15 key/mask pairs. Based on the 9 bits generated in the previous stage L1, one row of the L2 Memory is selected. Each lookup request reads all 15 entries from the selected row. Preferred embodiment is that all 15 entries are read in a single cycle. However, similar to L0 and L1, the 15 entries of L2 can be read 15 sequentially, but this could limit the rate at which requests could be serviced. The entries in this memory must be sorted, and reflect the maximum key stored in the corresponding row of the L3 Memory.

L2 Comparators/Priority Encoder/Next Address Generator

The 15 keys with associated priorities, along with the search key and the address generated from stage L2 are the input to this stage. This stage selects the smallest entry that is greater than or equal to the input search key. If multiple entries have the same key, the key with the smallest priority is selected. Again, if no entries are greater than the supplied key, the 4-bit value of the selected entry is the value 15. The position of the selected element, combined with the address of the row selected by the L1 stage, is the output of L2. Thus, in this embodiment, the 9-bit address from the output of the L1 stages is concatenated with the 4-bit value indicating which of the 16 elements was selected. The resulting 13 bit address is passed to the L2 stage.

L3 Memory

This memory is logically organized as 8,192 rows of 32 key/mask/pointer tuples. In addition, each row has 32 mask/pointer pairs and a 6-bit count. Based on the 13 bits generated in the previous block, one row of the L3 Memory is selected. Each lookup request reads all 32-entries from the selected row, plus the count and mask/pointer pairs. The preferred embodiment comprises that all data in the row are read in a single cycle. However, all the data elements may be read sequentially, but this could limit the rate at which requests could be serviced. The entries in each row of this memory are preferably sorted.

L3 Comparators/Priority Encoder/Next Address Generator

The 16 keys with associated masks and L4 data pointers and the other data from a row of the L3 Memory, along with the search key are the input to L3. This stage selects the smallest entry that equals to the input search key with the corresponding number of mask bits ignored. If multiple entries have the same key, the key with the smallest mask is selected. If no keys match the above requirements, the maximum key in the row is compared with the input search key using each of the 32 masks from the 32 mask/pointer pairs. The pointer is selected that corresponds to the smallest mask for which the input search key equals the maximum key in the row with the corresponding number of mask bits ignored. The L4 data pointer associated with the selected element is the output of this block. Thus, in this embodiment, a 17-bit pointer is passed to the L4 stage and provided as an output of the longest prefix match lookup engine 20.

L4 Memory

This memory is logically organized as 131,072 rows of 96 bits. Based on the 17 bits generated in the previous block, one row of the L4 Memory is selected. The 96-bits of the selected row are read from the memory and provided as an output of the lookup and to the L4 update logic. Accordingly, 13 bits of the 96 bits are passed to the L5 memory block.

L4 Update Logic

Associated with each lookup request, various fields of the 96-bit L4 data may be updated and written back to the L4 memory. For instance, the 96-bit data may represent a 20-bit time stamp, a 28-bit packet counter, and a 35-bit byte counter, in addition to the 13-bit pointer to the L5 data. Each of these fields may be updated as a result of a given lookup. This logic could be fixed, or it could be configurable by the user.

L5 Memory

This memory is logically organized as 8,192 rows of 256 bits. Based on the 13 bits read from the L4 memory, one row of the L5 Memory is selected. The 256 bits of the selected row are read from the L5 memory and provided as an output of the lookup, and 128 bits of the 256 bits are provided to the L5 update logic.

L5 Update Logic

Associated with each lookup request, various fields in 128 bits of each 256-bit L5 data element may be updated and written back to the L5 memory. Each of these fields may be updated as a result of a given lookup. This logic could be fixed, or it could be configurable by the user.

Organization of Memory Levels

Preferably, the exact sizes and organizations of the search memories can be configured according to the following rules:

---

N = Number of keys - A given number of total keys to be in final level of search memory M = Maximum nesting - Specifies the maximum supported depth of ranges which can be nested within other ranges.

L = Final level of search memory (e.g. 3 for the current example).

$W_L$ = Level L width - A given maximum number of keys from level L to be examined at once (or in sequence) for a given lookup request. We call this number of elements one row of the level L memory.

$W_{L-1}$ = Level L-1 width - A given maximum number of keys from level L-1 to be examined at once (or in sequence) for a given lookup request. We call this number of elements one row of the level L-1 memory.

$W_{L-2}$ = Level L-2 width - A given maximum number of keys from level L-2 to be examined at once (or in sequence) for a given lookup request. We call this number of elements one row of the level L-2 memory.

.
.
.

$W_0$ = L0 width - A given maximum number of keys from L0 to be examined at once (or in sequence) for a given lookup request. We call this number of elements one row of the level 0 memory.

---

First, the number of keys and number of levels are chosen. The various width values of each level of memory are determined by various implementation factors. The preferred embodiment is that N and $W_L$ are powers of two (e.g. 2,4,8,16,32,64, . . . ) and $W_{L-1}$, $W_{L-2}$, . . . , and $W_0$ are powers of two minus one (e.g. 1,3,7, 15,31,63 . . . ). Rows are only a logical concept, and not necessarily the physical structure of memory.

The following values can them be computed, wherein R represents the number of rows:

Number of rows of level L–$R_L=N/W_L$
Number of rows of level L-1–$R_{L-1}=R_L/(W_{L-1}+1)$
Number of rows of level L-2–$R_{L-2}=R_{L-1}/(W_{L-2}+1)$
(etc.)

All of these values must be chosen subject to the constraint that in the end, the following values result.

Number of rows of L0–$R_0=R_1/(W_0+1)=1$

The total size of each memory is:

$S_L=R_L*(((W_L*(\text{key size+mask size+pointer size}))+M*$ (mask size+pointer size)+$\log_2(W_L)+1)$, for level L.
$S_x=R_x*W_x*(\text{key size+mask size})$, for all x<L.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. A high performance network address processor comprising:
a longest prefix match lookup table for receiving a network address request having a designated network destination address, the longest prefix match lookup table having multiple pipelined lookup tables, a first pipelined lookup table having a single row of a first set of data pairs, the first set of data pairs including a key value and a mask value, the mask value indicating a number of least significant bits that are ignored within the key value, the first set of pairs being ordered according to corresponding mask values, a second pipelined lookup table having a plurality of rows of a second set of data pairs, the second set of data pairs including a key value and a mask value, the mask value of the second set indicating a number of least significant bits that are ignored within the key value; and
an associated data engine coupled to the longest prefix match lookup table that is capable of receiving a key and an output address pointer from the longest prefix match lookup table and that is capable of providing a network address processor data output corresponding to the designated network address pointer.

2. The high performance network address processor of claim 1 wherein the longest prefix match lookup engine includes a third pipelined lookup table having a plurality of rows of a third set of data tuples, the data tuples including a key value, a mask value and a pointer value.

3. The high performance network address processor of claim 1 wherein a value representing a position of a selected element in the single row of a first set of data pairs is an input to the second pipelined lookup table, the input used to select one of the plurality of rows of the second set of data pairs.

4. The high performance network address processor of claim 2 wherein a value representing a position of a selected element in the single row of a first set of data pairs is a first input to the second pipelined lookup table, the input used to select one of the plurality of rows of the second set of data pairs, a second input into the second pipelined lookup table is used to locate one of the data pairs of the one of the plurality of rows.

5. A high performance network address processor integrated circuit, wherein the network address processor integrated circuit comprises:
a longest prefix match lookup table engine for receiving a network address request having a designated network destination address, the longest prefix match lookup table engine having a plurality of pipelined lookup tables, a first pipelined lookup table having a single row of a first set of data pairs, the first set of data pairs including a key value and a mask value, the mask value indicating a number of least significant bits that are ignored within the key value, the first set of data pairs being ordered according to corresponding mask values, and a second pipelined lookup table having a plurality of rows of a second set of data pairs, the second set of data pairs including a key value and a mask value, the mask value of the second set indicating a number of least significant bits that are ignored within the key value; and
an associated data engine coupled to the longest prefix match lookup table that is capable of receiving a key value and an output address pointer from the longest prefix match lookup table and that is capable of providing a network address processor data output corresponding to the designated network address pointer, the associated data engine having a first lookup table having a plurality of rows, wherein a portion of bits of the key value is used to select one of the plurality of rows as an output, a remaining portion of the bits of the key value identifying a row in a second lookup table having a plurality of rows.

6. The high performance network address processor of claim 5 wherein the longest prefix match lookup engine a third pipelined lookup table having a plurality of rows of a third set of data tuples, the data tuples including a key value, a mask value and a pointer value.

7. The high performance network address processor of claim 5 wherein a value representing a position of a selected element in the single row of a first set of data pairs is an input to the second pipelined lookup table, the input used to select one of the plurality of rows of the second set of data pairs.

8. A high performance network addressing method comprising:
providing a longest prefix match lookup engine with a network address data request and a destination network address, wherein the longest prefix match lookup engine comprises a set of at least two lookup tables, each of the set of at least two lookup tables including data pairs including a corresponding key value and a corresponding mask, the corresponding mask value indicating a number of least significant bits that are ignored within the corresponding key value, the data pairs being ordered in each lookup table according to corresponding masks;
searching the set of lookup tables to select a look up engine address output from the set of lookup tables, the successive searching including,
selecting a position within a row of a first lookup table;
identifying a value associated with the position;
utilizing the value as a first input to a second lookup table;
selecting a row of the second lookup table according to the first input;
selecting a position within the row of the second lookup table according to a second input; and accessing a value stored in the position within the row of the second lookup table;

defining a pointer to be provided as input to an associated data engine; and searching the associated data engine to provide an associated destination address output.

9. The high performance network addressing method of claim 8 wherein successively searching the set of lookup tables comprises the smallest entry that is greater than or equal to an input search key, includes, selecting the smallest entry that equals the input search key with a corresponding number of mask bits, wherein if one or more entries comprise a same key, a key having a smallest mask is selected, and wherein if no key matches, a maximum key in a row is compared with the input search key using each set of respective mask pointer pairs, each of the pointer pairs is selected to correspond to the smallest mask for which the input search key equals the maximum key in a row of a corresponding lookup table with the corresponding number of mask bits ignored.

10. The high performance network address processor of claim 1 wherein the first set of data pairs are ordered such that a pair having a lowest mask value is at an end of the single row.

11. The high performance network address processor of claim 5 wherein the first set of data pairs are ordered such that a pair having a lowest mask value is at an end of the single row.

* * * * *